United States Patent [19]

Mecum

[11] 3,925,873
[45] Dec. 16, 1975

[54] BICYCLE FRAME ALIGNMENT APPARATUS

[76] Inventor: Robert C. Mecum, 5728 Monona Drive, Madison, Wis. 53716

[22] Filed: Feb. 3, 1975

[21] Appl. No.: 546,193

[52] U.S. Cl. ................................................ 29/271
[51] Int. Cl.² ...................................... B25B 27/14
[58] Field of Search ............ 29/271, 407; 269/54.4; 248/298, 176; 33/193, 180 R; 72/388, 705, 458

[56] References Cited
UNITED STATES PATENTS

| | | | |
|---|---|---|---|
| 2,479,723 | 8/1949 | Brown | 33/193 |
| 2,590,722 | 3/1952 | Otis | 33/193 |
| 2,667,798 | 2/1954 | Beasley | 72/458 |

FOREIGN PATENTS OR APPLICATIONS

| | | | |
|---|---|---|---|
| 135,655 | 5/1952 | Sweden | 248/298 |

*Primary Examiner*—James L. Jones, Jr.
*Attorney, Agent, or Firm*—Theodore J. Long; John M. Winter; Harry C. Engstrom

[57] ABSTRACT

Apparatus and method for aligning the rear stays of a bicycle frame. The apparatus has an elongate bar slidably engagable within an elongate tube. Seat and head tube spindles secured in upright positions at opposite ends of the elongate tube and bar are inserted into the head and seat tubes of a bicycle frame. An elastic band is attached to the rear dropouts and stretched around the head tube of the bicycle frame. A stay aligning tool is placed against either side of the seat tube and levered against the rear stays of the bicycle frame until the distance from the elastic band to the seat tube is equal on each side while maintaining the rear hub width between the dropouts.

2 Claims, 3 Drawing Figures

BICYCLE FRAME ALIGNMENT APPARATUS

BACKGROUND OF THE INVENTION

1. Field of the Invention

This invention pertains to an apparatus and method for aligning the rear stays of a bicycle frame.

2. Description of the Prior Art

As the bicycle has become a more common source of recreation and transportation, the demand for bicycles, particularly multi-speed bicycles such as five and ten speed models has increased substantially. A critical factor in the performance of a bicycle is the proper alignment of the rear stays of the bicycle frame during the initial setup. The proper alignment of the rear stays facilitates easy mounting and correct operation of the rear wheel and, in the case of multi-speed bicycles, facilitates proper tracking of the chain on the derailleur gear system. Generally, misalignment of the rear stays has not been noticed until after installation of the rear wheel and often goes uncorrected resulting in poor tracking of the chain and generally less than optimum performance for the user.

SUMMARY OF THE INVENTION

The present invention provides an apparatus and method for obtaining the proper alignment of the rear stays of a bicycle frame before installation of the rear wheel in a maner that is believed heretofore unknown in the bicycle industry.

My new and improved apparatus and method for aligning the rear stays of a bicycle frame has an elongate bar telescopingly received in an elongate tube. A seat tube spindle and head tube spindle are secured at opposite ends to the elongate bar and tube. The elongate bar can be positioned within the elongate tube so that the distance between the seat tube spindle and the head tube spindle corresponds to the distance between the seat tube and head tube on various sized bicycle frames. After the bicycle frame has been mounted on the spindles, an elastic band is stretched around the head tube of the bicycle frame to the rear dropouts. A stay aligning tool is placed against either side of the seat tube and levered against the rear stays of the bicycle frame, while maintaining the proper hub distance between the dropouts, until the distance from the elastic band to the seat tube is equal on each side, thereby assuring that the rear stays of the bicycle frame are in proper alignment.

Other objects, features and advantages of my invention will become apparent from the following detailed description of the drawings wherein a preferred embodiment of the invention has been selected for exemplification.

DESCRIPTION OF THE PREFERRED EMBODIMENT

Figure 1:
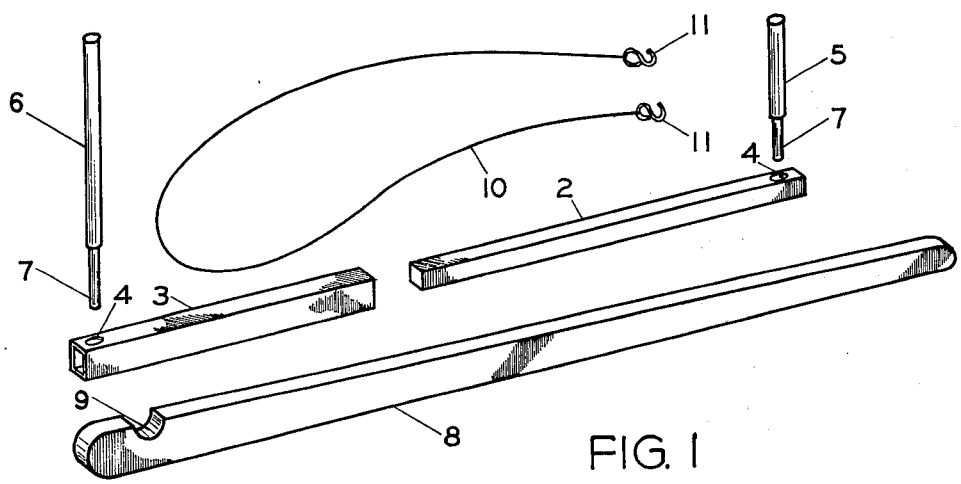
FIG. 1 is an exploded perspective view of my invention.
Figure 2:
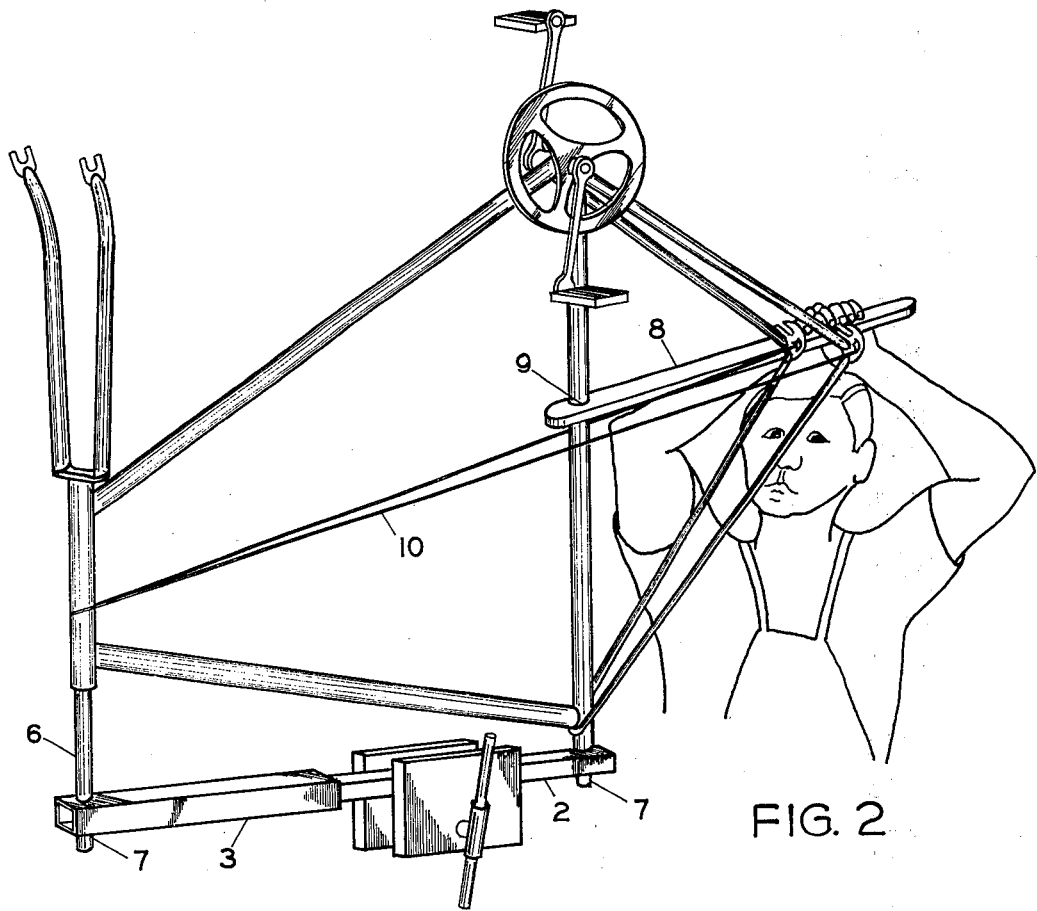
FIG. 2 is a perspective view of my invention mounted in a vice illustrating a mechanic aligning the rear stays of a bicycle frame.

Referring more particularly to the drawings, wherein like numerals refer to like parts throughout the views, FIGS. 1 and 2 illustrate a preferred embodiment of my bicycle frame alignment apparatus.

As is best shown in FIG. 1, my invention has a square elongate steel bar 2 slidably receivable within a square elongate steel tube 3. A pair of transverse holes 4 are located at opposite ends of the slidably engagable elongate bar 2 and tube 3. A steel seat tube spindle 5 and a somewhat longer head tube spindle 6 have turned lower sections 7 that are inserted into the transverse holes 4. An elastic band 10, having fastening hooks 11, and a tapered hard wood stay aligning tool 8, having a curved notch 9, are used in the alignment of the rear stays, as will be explained below.

As is best shown in FIG. 2, the elongate bar 2 can be secured in a stationary position by conventional means such as the vice shown. The elongate tube 3 is slid over the elongate bar 2 until the head tube spindle and the seat tube spindle can be inserted simultaneously into the head tube and seat tube of the particular sized bicycle frame to be aligned. A head tube spindle of three-fourths inch diameter and a seat tube spindle of three-fourths inch or 1 inch diameter may be inserted to fit imported or American bicycle frames, respectively.

Figure 3:
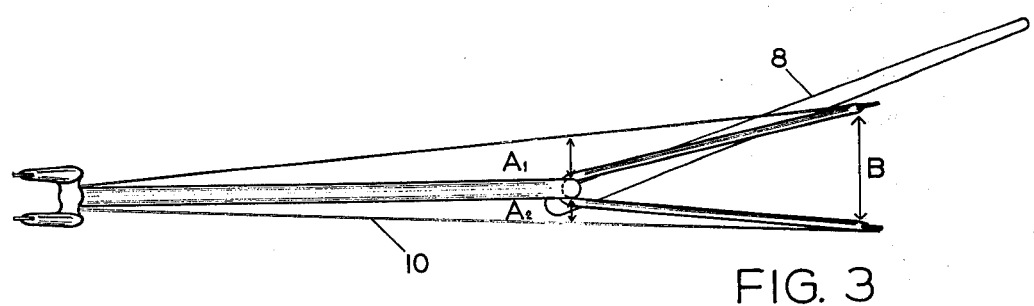
FIG. 3 is a plan view of my invention as shown in FIG. 2 with the gear and pedal assembly of the bicycle frame broken away.

As also depicted in FIG. 2, after the bicycle frame has been mounted on the seat and heat tube spindles, the fastening hooks of the elastic band 10 are attached to the rear dropouts and the elastic band is stretched around the head tube post. The bicycle mechanic measures the distance from the elastic band to the seat tube post on each side, represented by A1 and A2 in FIG. 3. If the distances are unequal the rear stays of the bicycle frame are not properly aligned and are in need of adjustment. The stay aligning tool 8, having a curved notch 9, is engaged against either side of the seat tube, and levered against the rear stays of the bicycle frame until the distance between the elastic band and the seat tube on each side is equal. During this operation the distance between the rear dropouts of the bicycle frame represented by B in FIG. 2 must be maintained at a predetermined distance to allow for mounting of the rear wheel hub without bending the rear stays out of alignment. After the rear stays have been properly aligned, the bicycle frame is ready for mounting of the rear wheel and, in the case of a multi-speed bicycle, the derailleur gear system.

It is to be further understood that my invention is not confined to the particular construction or arrangement of parts herein illustrated and described, but embraces all such modified forms thereof as come within the scope of the following claims.

I claim:

1. A method of aligning the rear stays of a bicycle frame having a head tube, a seat tube, rear stays, and rear dropouts, said method comprising:
   a. placing the head and seat tubes of a bicycle frame over stationary head and seat tube spindles,
   b. attaching an elastic band from the rear dropouts forward around the head tube of the bicycle frame, and
   c. placing a stay aligning tool against either side of the head tube of the bicycle frame and levering the rear stays of the bicycle frame into a position to equalize the distance from the elastic band to the seat tube on each side while maintaining the desired rear wheel hub distance between the rear dropouts.

2. Apparatus for aligning a bicycle frame having a head tube, a seat tube, rear stays, and rear dropouts, said apparatus comprising:
   a. an elongate tube,
   b. an elongate bar slidably receivable within the elonate tube,
   c. a seat tube spindle for insertion into the seat tube of a bicycle frame,
   d. a head tube spindle for insertion into the head tube of a bicycle frame,
   e. means for securing the seat tube spindle and the head tube spindle in upright positions at opposite ends of the slidably engageable elongate tube and bar,
   f. a stay aligning tool that extends from the seat tube beyond the rear stays of a bicycle frame,
   g. an elastic band stretchable from the rear dropouts of the bicycle frame forward around the head tube of the bicycle frame so that the rear stays of the bicycle frame can be aligned by equalizing the distance from the elastic band to the seat tube on each side, and
   h. fastening means connected to the ends of the elastic band for attachment to the rear dropouts of the bicycle frame.

* * * * *